Aug. 5, 1958
H. L. PENBERTHY
2,845,750
GLASS FURNACE
Filed March 9, 1955
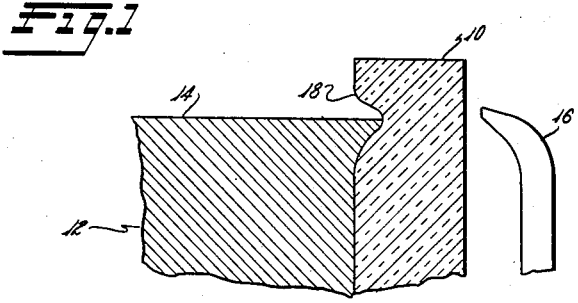
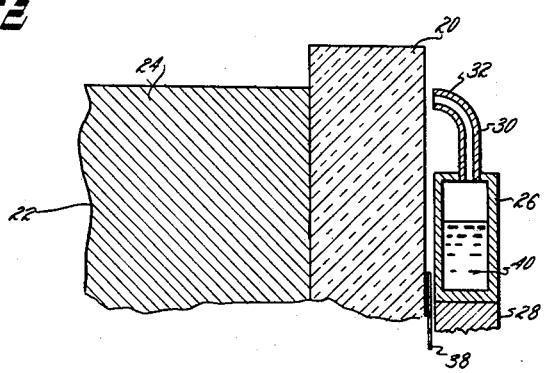
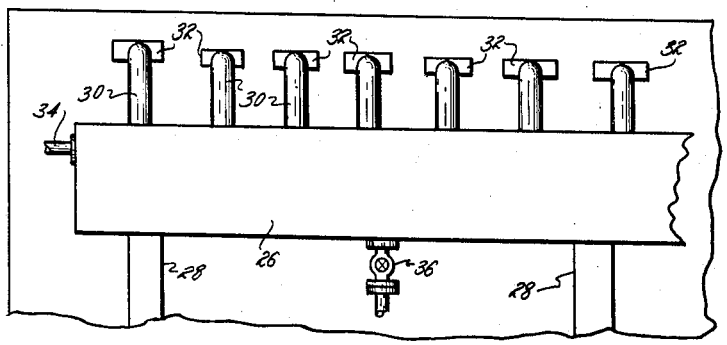
INVENTOR
HARVEY L. PENBERTHY
BY Strauch, Nolan & Diggins
ATTORNEYS

United States Patent Office 2,845,750
Patented Aug. 5, 1958

2,845,750

GLASS FURNACE

Harvey L. Penberthy, Seattle, Wash.

Application March 9, 1955, Serial No. 493,209

6 Claims. (Cl. 49—54)

This invention relates to glass furnaces and more particularly relates to a means and method for cooling the walls of glass furnaces.

In the normal operation of glass furnaces the inner surfaces of the walls tend to erode badly as the level of the glass rises and falls and pulls particles of the walls away through a surface tension phenomenon. The walls tend to sluff off and a depression is thus created which, if allowed to progress, will in time destroy the top of the tank wall.

In most furnace operations an attempt is made to counteract this erosion process by providing air cooling of the outside surfaces of the furnace walls at approximately the liquid level.

According to the present invention it is proposed to carry out a more efficient cooling of the furnace walls without the expenditure of any separately purchased energy. Thus according to the invention the walls of a glass furnace are provided with long hollow boilers running therealong in proximity thereto, in a position to absorb radiant heat from the walls. These boilers have water or other suitable liquid therein and are provided with a plurality of pipes and nozzles directed at the furnace wall. The heat radiated from the furnace wall causes the water in the boilers to boil and the steam thus produced is directed by means of the pipes and nozzles against the tank walls to exercise a cooling function. Since steam has a higher specific heat than air a more efficient cooling is obtained and, more important, the energy utilized in generating the steam is obtained entirely without cost. The energy to heat the water to a boiling temperature is itself removed from the furnace wall so that an even further cooling effect is provided.

It is accordingly a primary object of the present invention to provide a means and method of cooling hot walls wherein the energy expended in such cooling is generated by the hot wall itself.

It is another object of the present invention to provide a means and method of cooling the walls of glass furnaces wherein furnace radiation is utilized to generate the coolant.

It is another object of the present invention to provide a means and method of cooling furnace walls wherein heat radiated from the furnace walls is utilized to generate steam which cools the walls.

It is another object of the present invention to provide a means and method of cooling furnace walls wherein boilers are provided adjacent the walls in such a position that heat radiated from the furnace walls generates steam in the boilers that may be directed against portions of the wall which it is desired to cool.

It is a further object of the present invention to provide a means of applying a variable amount of coolant to furnace walls wherein the coolant generator is heated by radiation from the furnace walls and wherein a means is provided for controlling the amount of such radiation which reaches the coolant generator.

Further objects and advantages of the invention will become apparent upon reference to the following specification and claims and to the appended drawings wherein:

Figure 1 is partial cross section of the wall of a furnace showing the effect of insufficient cooling;

Figure 2 is partial cross section of the wall of a furnace showing a cooling arrangement according to the present invention; and Figure 3 is a vertical elevation of a portion of a furnace wall showing a coolant generator according to the present invention.

Referring to Figure 1 there is shown at 10 the wall of a glass furnace containing a molten body of glass 12 having a surface 14. An air nozzle 16 is provided on the outside surface of the furnace wall 10 to provide a blast of air approximately in line with the level 14 of the glass within the furnace.

Where no furnace wall cooling is provided, or where the conventional air cooling shown in Figure 1 is ineffective, the rise and fall of the surface 14 of the glass mass 12 in the tank causes an erosion of the inner face of the wall 10 as shown at 18. If this erosion is allowed to continue unchecked it in time destroys the top of the furnace wall and necessitates replacement thereof. Conventional air blowers 16 are utilized in an attempt to eliminate this erosion and to retard it to a certain degree. Such blowers, however, necessitate a supply of air and a large glass tank will utilize up to 300 horsepower of air in order to provide effective cooling. While such air cooling tends to mitigate the tank erosion problem it adds an expense item to production costs such that the final glass product is more expensive.

Referring more particularly to Figures 2 and 3 there is shown the cooling apparatus of the present invention. A furnace wall 20 enclosing a molten body of glass 22 having a surface 24 has an elongated boiler 26 mounted adjacent thereto on any suitable support 28. The boiler 26 is provided with a plurality of vertical pipes 30 which terminate in flattened nozzles 32 directed against the side of the wall 20 approximately opposite the level 24 of the glass mass 22. The boiler 26 may be provided with a water inlet 34 and with a drain valve 36.

According to the invention the boiler 26 may be mounted in contact with the wall 20 and may be maintained in this position by means of jack bolts or the boiler may be mounted some distance from the wall in which case most of the heat transferred to the boiler will be by radiation from the tank wall. The rate of steam generation may be controlled by providing movable shields 38, such as sheets of aluminum between the furnace wall 20 and the boiler 26 so as to limit the amount of heat reaching the boiler. As an alternative the boilers may be movably mounted so as to vary their spacing from the furnace wall although this is less desirable since it also causes movement of the nozzles 32.

In operation heat is transferred from the furnace wall to the boiler 26 by radiation or conduction or both causing the water 40 in the boiler to boil to create steam which is directed against the furnace wall by means of the pipes 30 and nozzles 32. A cooling effect is created opposite the glass level 24 to prevent erosion of the furnace wall and a further cooling effect is exercised opposite the boilers where the heat carried off through the boiling operation cools the furnace wall.

It will be apparent from the foregoing that there has been provided a method of cooling furnace walls which is both efficient and economical and which requires a very small amount of extremely simple equipment.

It will be apparent that other hot objects than glass furnace walls may be cooled according to the invention and that the nozzles need not be directed at the very wall from which the heat is removed. That is to say, the boiler may be mounted adjacent one conveniently accessible furnace wall and the steam generated therein used to cool other or all walls of the furnace.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for cooling the refractory wall of a glass furnace having a molten mass of glass therein comprising in combination, a boiler adjacent said wall below the surface of said glass and containing a liquid, said boiler being sufficiently close to said wall that heat from said wall causes said liquid to boil to generate a vapor, and port means in said boiler directing the vapor generated therein against said furnace wall substantially at the level of the surface of the glass mass therein to cool said wall at that point.

2. An apparatus as set out in claim 1 wherein said boiler comprises an elongated tank external of said wall extending along said wall.

3. An apparatus as set out in claim 2 wherein said port means comprises a plurality of nozzles arranged substantially in a line along said wall at substantially the level of the surface of the glass mass.

4. An apparatus as set out in claim 1 including means for regulating the heat flowing from said wall to said boiler.

5. In a glass manufacturing process involving the processing of molten glass in a furnace, the steps in cooling a wall of said furnace comprising, maintaining a supply of liquid in a boiler adjacent said furnace wall below the level of the surface of the glass in said furnace and so close to said wall that heat from said wall boils said liquid to generate a vapor, and directing said vaporized liquid to concentrated points along said furnace wall substantially at the level of the surface of said molten glass.

6. An apparatus for cooling the refractory wall of a glass furnace having a molten mass of glass therein comprising in combination, an elongated boiler adjacent said wall and containing water, said boiler being sufficiently close to said wall so as to allow heat from said wall to cause said water to boil, a sheet of reflective material movable between said wall and said boiler for varying the amount of heat flowing from said wall to said boiler, a plurality of nozzles arranged substantially in a line along said wall at substantially the level of the surface of the liquid therein and being directed at said wall, and conduit means connecting each nozzle with said boiler so as to cause steam generated in said boiler to flow through said nozzles onto said wall.

References Cited in the file of this patent
UNITED STATES PATENTS

| | | |
|---|---|---|
| 929,899 | Thornburg | Aug. 3, 1909 |
| 1,325,172 | Sherwood | Dec. 16, 1919 |

FOREIGN PATENTS

| | | |
|---|---|---|
| 6,680 | Great Britain | 1913 |
| 702,481 | Great Britain | Jan. 20, 1954 |